United States Patent
Saad et al.

(10) Patent No.: US 11,917,464 B2
(45) Date of Patent: Feb. 27, 2024

(54) 5G NR EFFICIENT FR1/FR2 OPERATION

(71) Applicant: Apple Inc., Cupertino, CA (US)

(72) Inventors: Muhammad Saad, Sachse, TX (US); Syed A Rahim, Allen, TX (US); Sharad Garg, Cupertino, CA (US); Vijay Venkataraman, San Jose, CA (US); Jia Tang, San Jose, CA (US); Wenping Lou, San Jose, CA (US); Thanigaivelu Elangovan, Santa Clara, CA (US); Pengkai Zhao, San Jose, CA (US); Tarakkumar G Dhanani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 17/331,331

(22) Filed: May 26, 2021

(65) Prior Publication Data
US 2021/0385707 A1    Dec. 9, 2021

Related U.S. Application Data

(60) Provisional application No. 63/035,487, filed on Jun. 5, 2020.

(51) Int. Cl.
*H04W 36/00* (2009.01)
*H04W 74/08* (2009.01)
*H04W 24/04* (2009.01)
*H04W 76/19* (2018.01)

(52) U.S. Cl.
CPC ....... *H04W 36/0079* (2018.08); *H04W 24/04* (2013.01); *H04W 74/0833* (2013.01); *H04W 76/19* (2018.02); *H04W 36/0069* (2018.08)

(58) Field of Classification Search
CPC . H04W 76/19; H04W 76/15; H04W 36/0069; H04W 24/10; H04W 76/18; H04W 36/0079; H04W 36/305
See application file for complete search history.

(56) References Cited

U.S. PATENT DOCUMENTS

| 2013/0143550 A1* | 6/2013 | Ostrup | H04W 24/10 |
| | | | 455/424 |
| 2019/0182883 A1* | 6/2019 | He | H04W 88/18 |
| 2021/0028976 A1* | 1/2021 | Jia | H04L 41/0654 |

* cited by examiner

*Primary Examiner* — Nam T Huynh
(74) *Attorney, Agent, or Firm* — Kowert, Hood, Munyon, Rankin & Goetzel, P.C.

(57) ABSTRACT

Apparatuses, systems, and methods for RACH procedures to avoid excessive handover/secondary cell group failures. A base station may declare a handover and/or secondary cell group (SCG) failure and may determine that a failure threshold has been met. The base station may perform a remedial action in response to meeting the failure threshold. The failure threshold may be multi-dimensional, where a first dimension is associated with a number of handover/SCG failures and where a second dimension is associated with a time period in which the number of handover/SCG failures occurred. Further, a third dimension may be associated with a UE mobility state and a fourth dimension may be associated with whether the UE is using FR1 or FR2. The remedial action in response to meeting the failure threshold may include the base station suspending transmission of measurement object configurations for a specified period of time.

20 Claims, 14 Drawing Sheets

5G NR EFFICIENT FR1/FR2 OPERATION

PRIORITY DATA

This application claims benefit of priority to U.S. Provisional Application Ser. No. 63/035,487, titled "5G NR Efficient FR1/FR2 Operation", filed Jun. 5, 2020, which is hereby incorporated by reference in its entirety as though fully and completely set forth herein.

FIELD

The invention relates to wireless devices, and more particularly to a system and method for enhanced RACH procedures to avoid excessive handover/secondary cell group failures.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR may provide a higher capacity for a higher density of mobile broadband users, also supporting device-to-device, ultra-reliable, and massive machine type communications with lower latency and/or lower battery consumption. Further, the 5G-NR may allow for more flexible UE scheduling as compared to current LTE. Consequently, efforts are being made in ongoing developments of 5G-NR to take advantage of higher throughputs possible at higher frequencies.

SUMMARY

Embodiments relate to apparatuses, systems, and methods for enhanced RACH procedures to avoid excessive handover/secondary cell group failures.

For example, in some embodiments, a user equipment device (UE) may declare a random access channel (RACH) procedure failure and may determine, based, at least in part, on the RACH procedure failure, that a RACH failure threshold has been met. The UE may perform one or more remedial actions in response to meeting the RACH failure threshold. In some embodiments, the RACH failure threshold may be multi-dimensional, where a first dimension is associated with a number of RACH procedure failures and a second dimension is associated with a time period in which the number of RACH procedure failures occurred. Further, in some embodiments, a third dimension may be associated with a UE mobility state. Additionally, in some embodiments, a fourth dimension may be associated with whether the UE is using FR1 or FR2. In some embodiments, the one or more remedial actions in response to meeting the RACH failure threshold may include the UE performing one or more of switching transmission beams for a preamble PRACH transmission, starting with a higher initial preamble transmit power for subsequent RACH attempts, reducing a number of PRACH attempts before declaring failure by half; and/or increasing a step size for power ramping of preamble PRACH transmissions.

As another example, in some embodiments, a base station may declare a handover and/or secondary cell group (SCG) failure and may determine that a failure threshold has been met. The base station may perform a remedial action in response to meeting the failure threshold. In some embodiments, the failure threshold may be multi-dimensional, where a first dimension is associated with a number of handover/SCG failures and where a second dimension is associated with a time period in which the number of handover/SCG failures occurred. Further, in some embodiments, a third dimension may be associated with a UE mobility state. Additionally, in some embodiments, a fourth dimension may be associated with whether the UE is using FR1 or FR2. In some embodiments, the remedial action in response to meeting the failure threshold may include the base station suspending transmission of measurement object configurations for a specified period of time.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
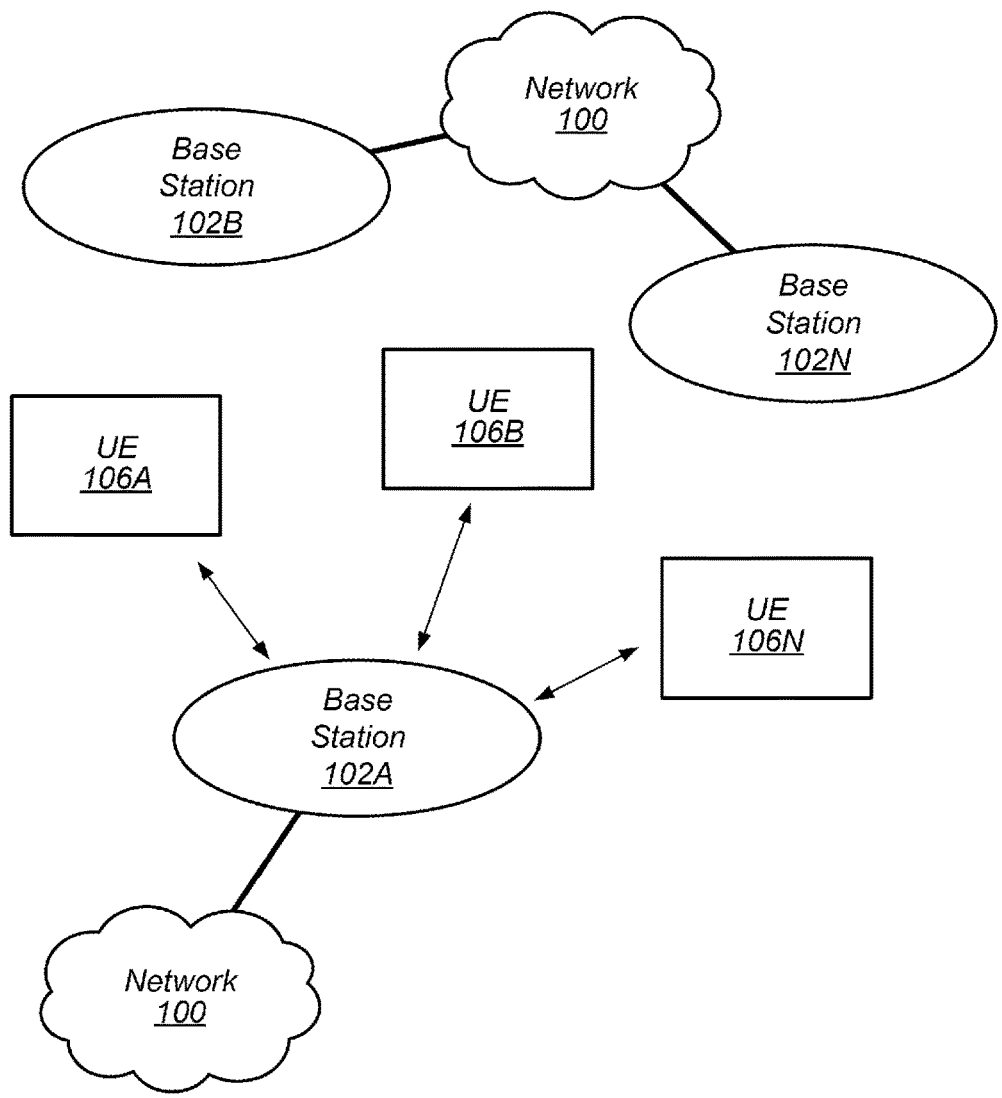
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GCN: 5G Core Network
IE: Information Element Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
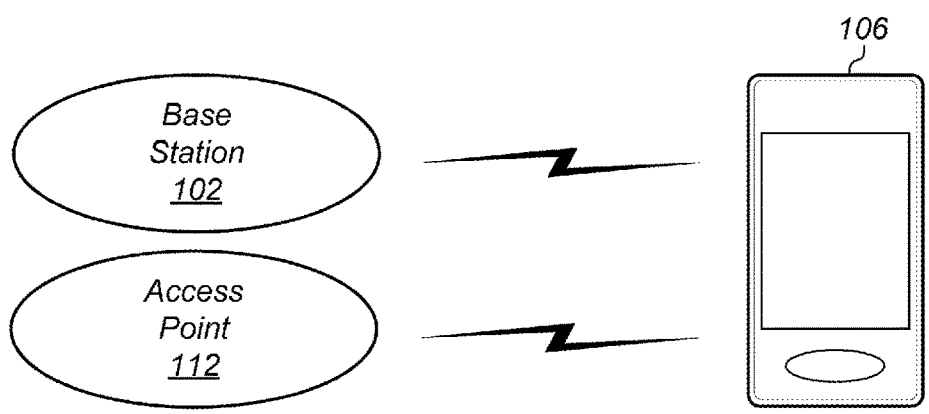
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
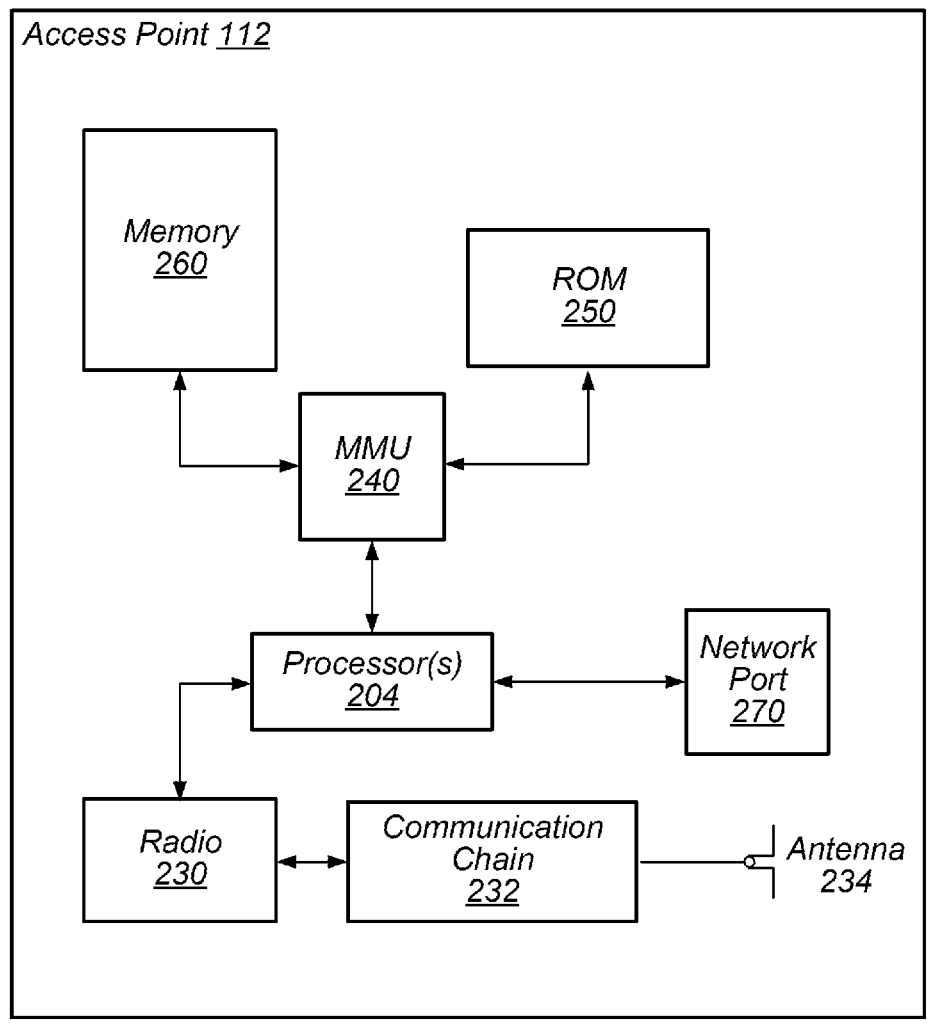
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for enhanced RACH procedures to avoid excessive handover/secondary cell group failures as further described herein.

Figure 3:
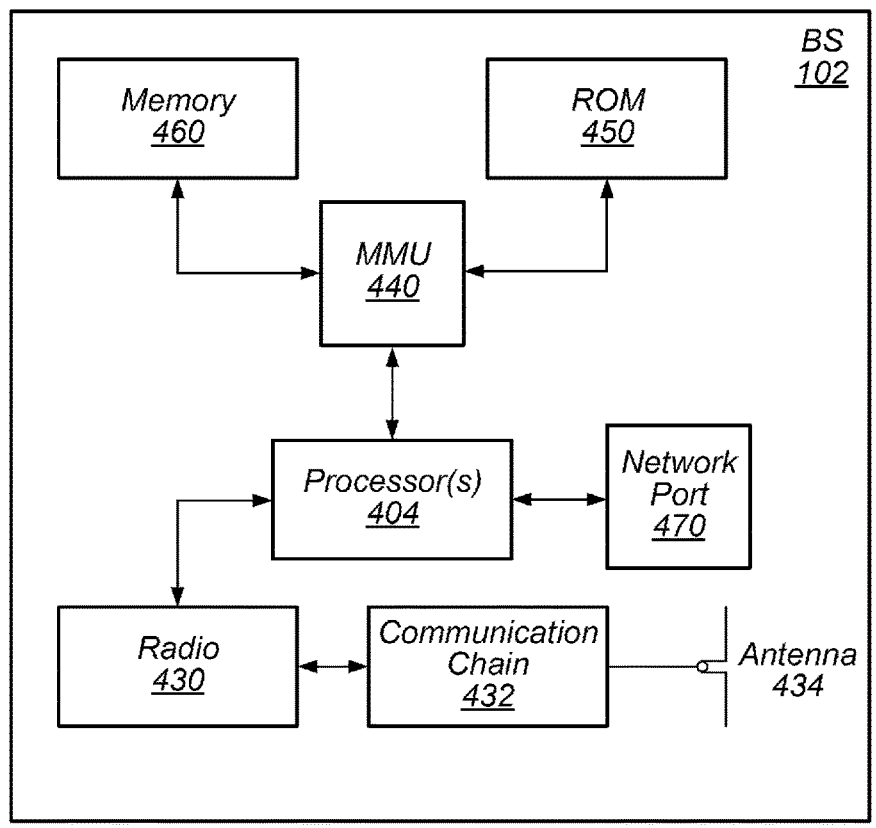
FIG. 3 illustrates an example block diagram of a BS according to some embodiments.

FIG. 3: Block Diagram of a Base Station

FIG. 3 illustrates an example block diagram of a base station 102, according to some embodiments. It is noted that the base station of FIG. 3 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 4:
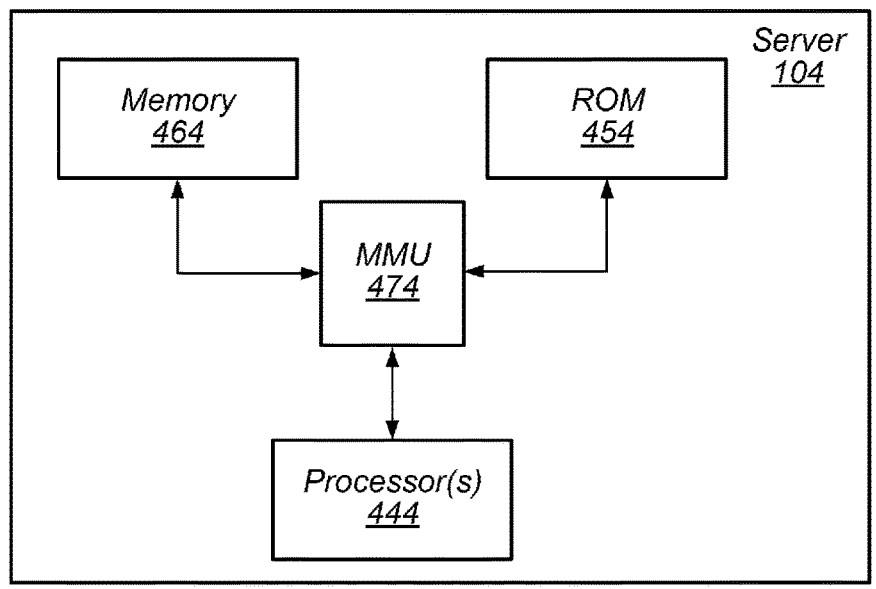
FIG. 4 illustrates an example block diagram of a server according to some embodiments.

FIG. 4: Block Diagram of a Server

FIG. 4 illustrates an example block diagram of a server 104, according to some embodiments. It is noted that the base station of FIG. 4 is merely one example of a possible server. As shown, the server 104 may include processor(s) 444 which may execute program instructions for the server 104. The processor(s) 444 may also be coupled to memory management unit (MMU) 474, which may be configured to receive addresses from the processor(s) 444 and translate those addresses to locations in memory (e.g., memory 464 and read only memory (ROM) 454) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 444 of the server 104 may be configured to implement or support implementation of part or all of the methods described herein, e.g., by executing program instructions stored on a memory medium (e.g., a non-transitory computer-readable memory medium). Alternatively, the processor 444 may be configured as a programmable hardware element, such as an FPGA (Field Programmable Gate Array), or as an ASIC (Application Specific Integrated Circuit), or a combination thereof. Alternatively (or in addition) the processor 444 of the server 104, in conjunction with one or more of the other components 454, 464, and/or 474 may be configured to implement or support implementation of part or all of the features described herein.

In addition, as described herein, processor(s) 444 may be comprised of one or more processing elements. In other words, one or more processing elements may be included in processor(s) 444. Thus, processor(s) 444 may include one or more integrated circuits (ICs) that are configured to perform the functions of processor(s) 444. In addition, each integrated circuit may include circuitry (e.g., first circuitry, second circuitry, etc.) configured to perform the functions of processor(s) 444.

Figure 5A:
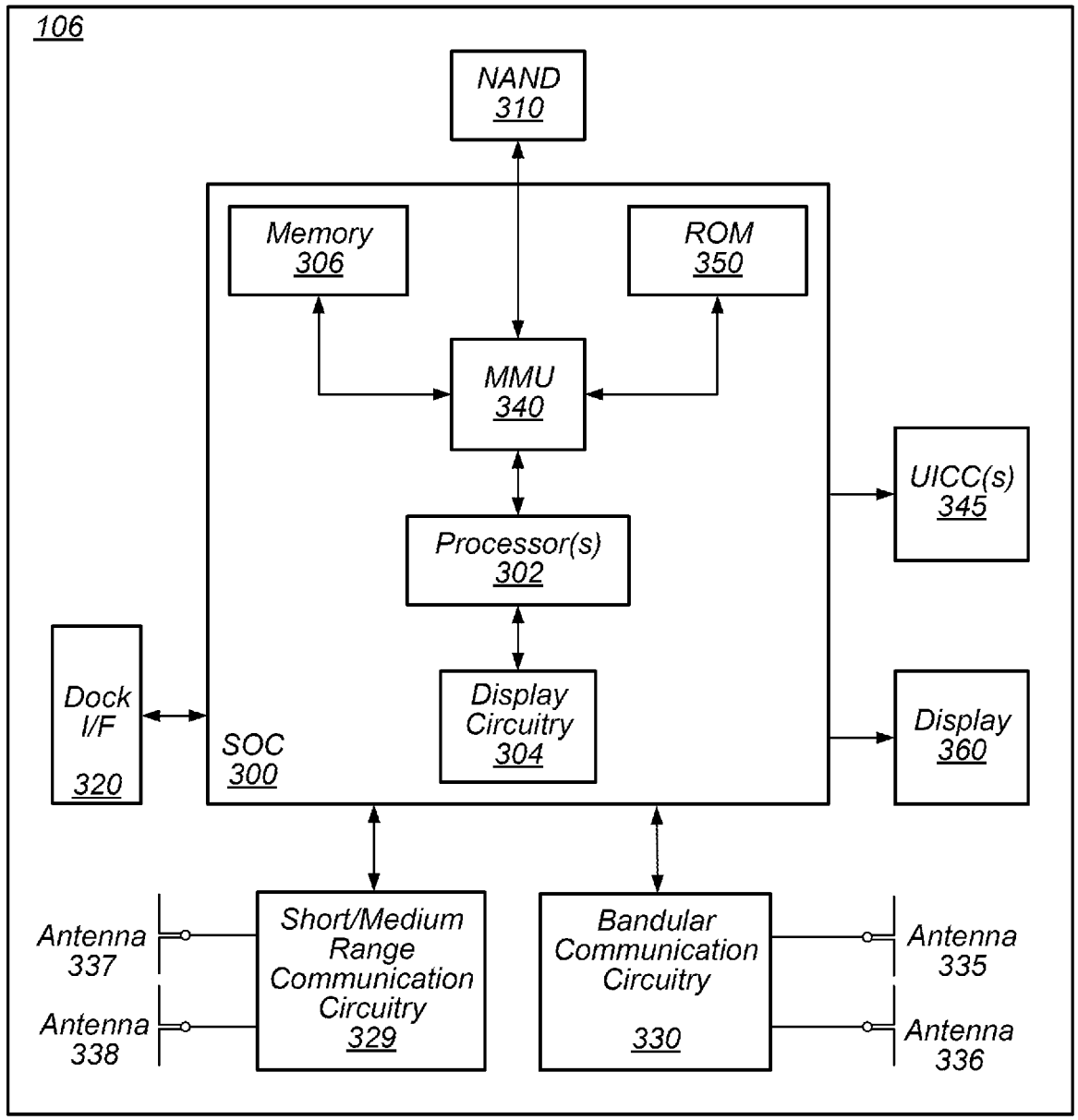
FIG. 5A illustrates an example block diagram of a UE according to some embodiments.

FIG. 5A: Block Diagram of a UE

FIG. 5A illustrates an example simplified block diagram of a communication device 106, according to some embodiments. It is noted that the block diagram of the communication device of FIG. 5A is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMS. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMS in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for enhanced RACH procedures to avoid excessive handover/secondary cell group failures as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 5B:
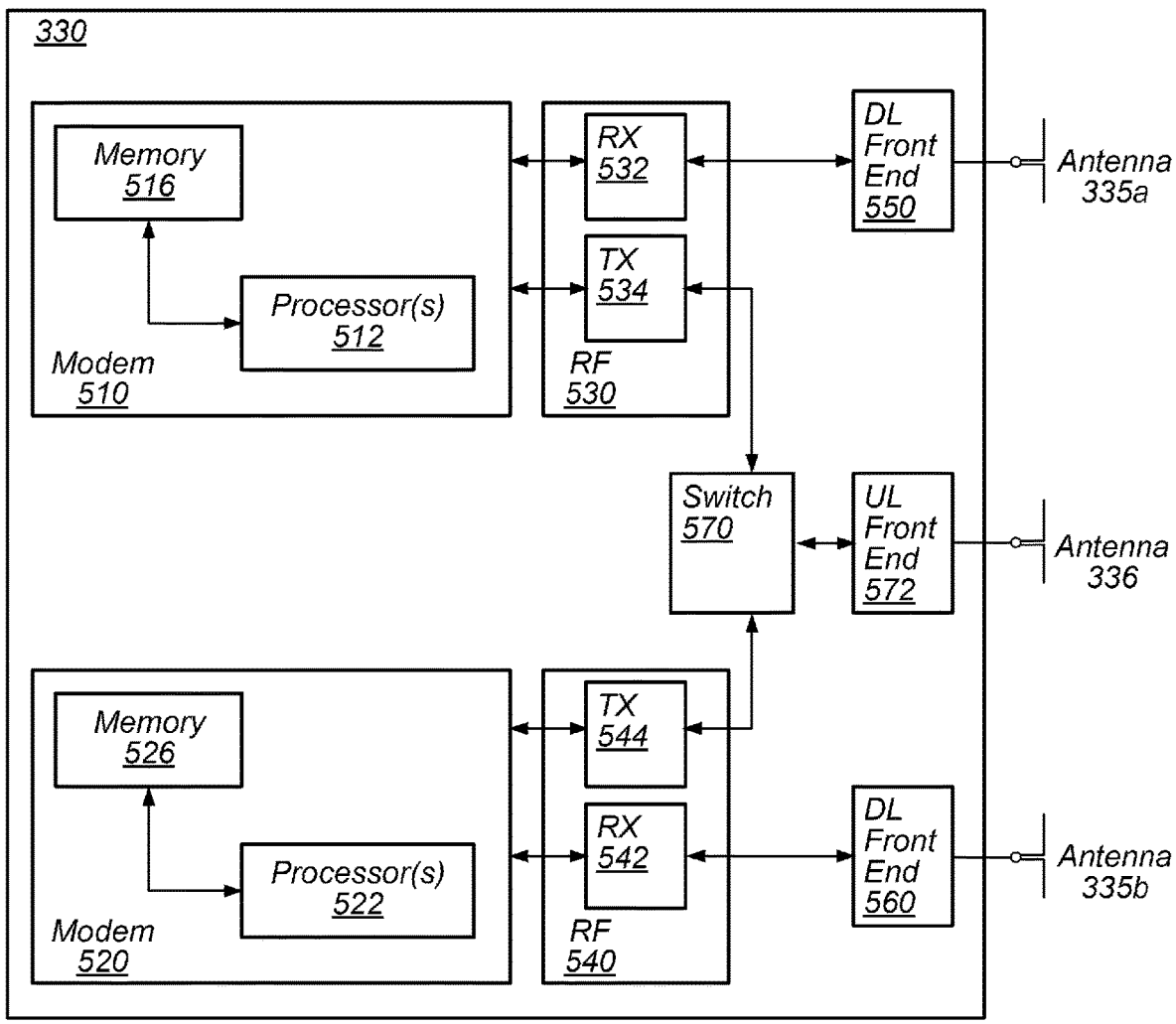
FIG. 5B illustrates an example block diagram of cellular communication circuitry, according to some embodiments.

FIG. 5B: Block Diagram of Cellular Communication Circuitry

FIG. 5B illustrates an example simplified block diagram of cellular communication circuitry, according to some embodiments. It is noted that the block diagram of the cellular communication circuitry of FIG. 5B is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for enhanced RACH procedures to avoid excessive handover/secondary cell group failures as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
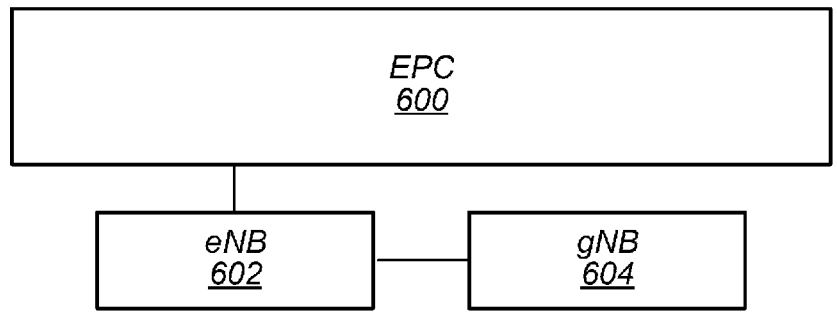
FIG. 6A illustrates an example of connections between an EPC network, an LTE base station (eNB), and a 5G NR base station (gNB).
Figure 6B:
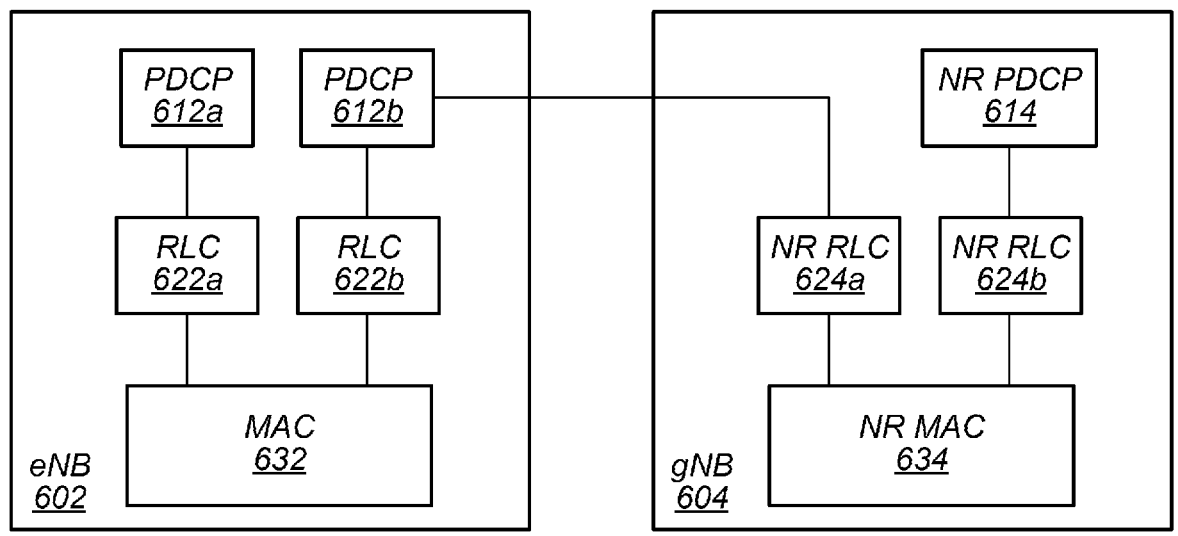
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a*-*b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer with EPC network 600 whereas PDCP layer 612*b* may interface via a split bearer with EPC network 600.

Additionally, as shown, gNB 604 may include a MAC layer 634 that interfaces with RLC layers 624*a*-*b*. RLC layer 624*a* may interface with PDCP layer 612*b* of eNB 602 via an X$_2$ interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
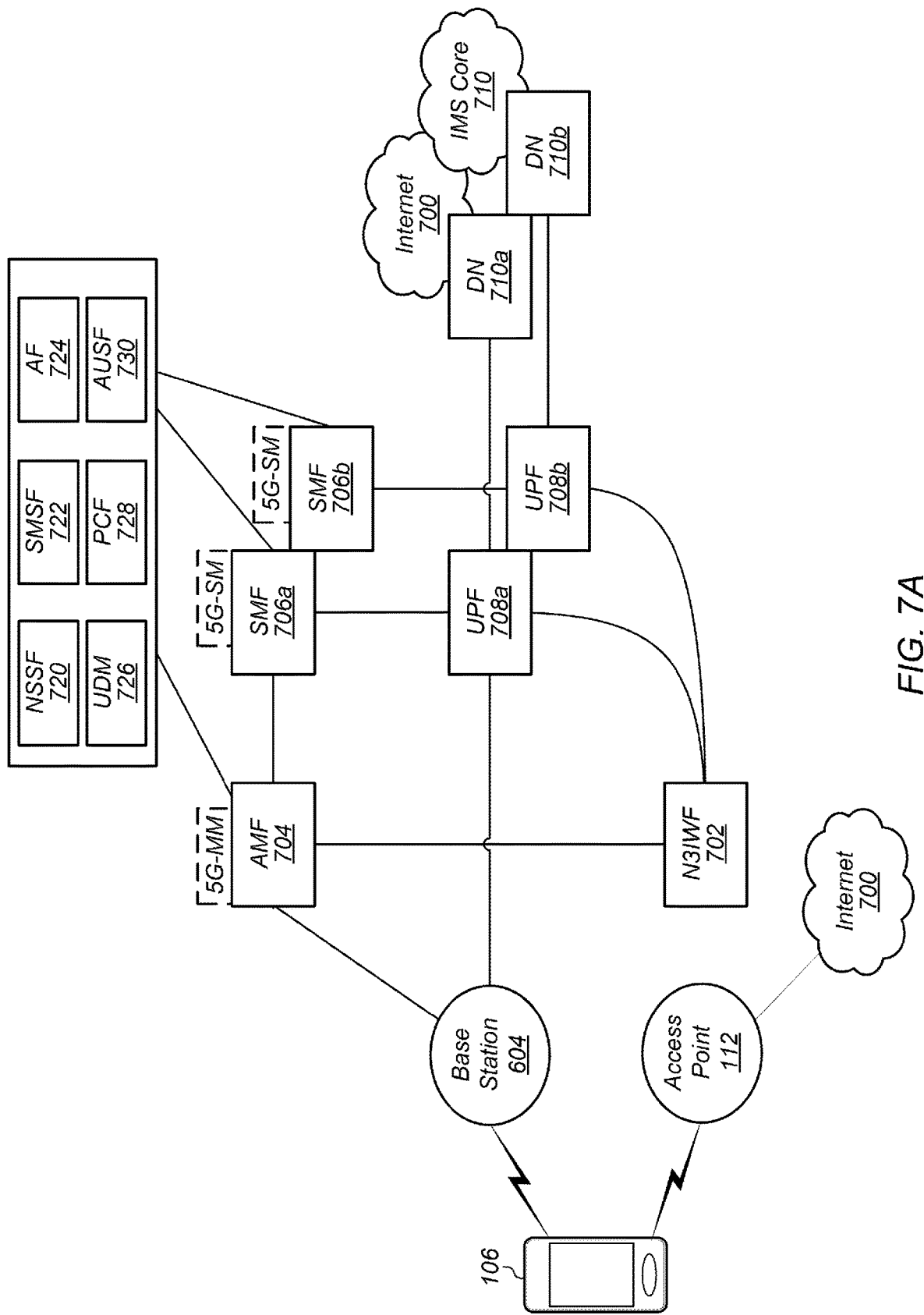
FIG. 7A illustrates an example of a 5G network architecture that incorporates both 3GPP (e.g., cellular) and non-3GPP (e.g., non-cellular) access to the 5G CN, according to some embodiments.
Figure 7B:
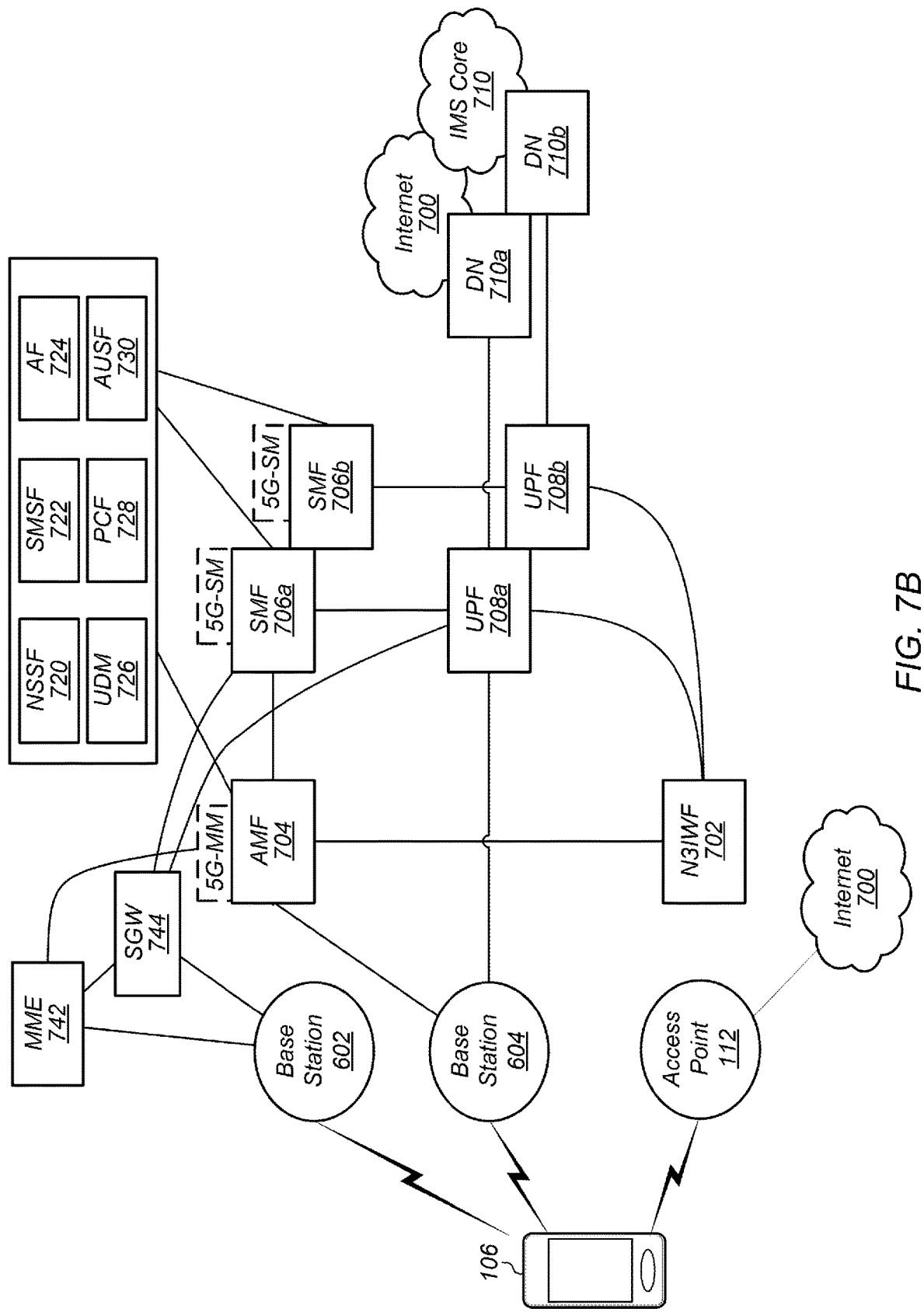
FIG. 7B illustrates an example of a 5G network architecture that incorporates both dual 3GPP (e.g., LTE and 5G NR) access and non-3GPP access to the 5G CN, according to some embodiments.
Figure 8:
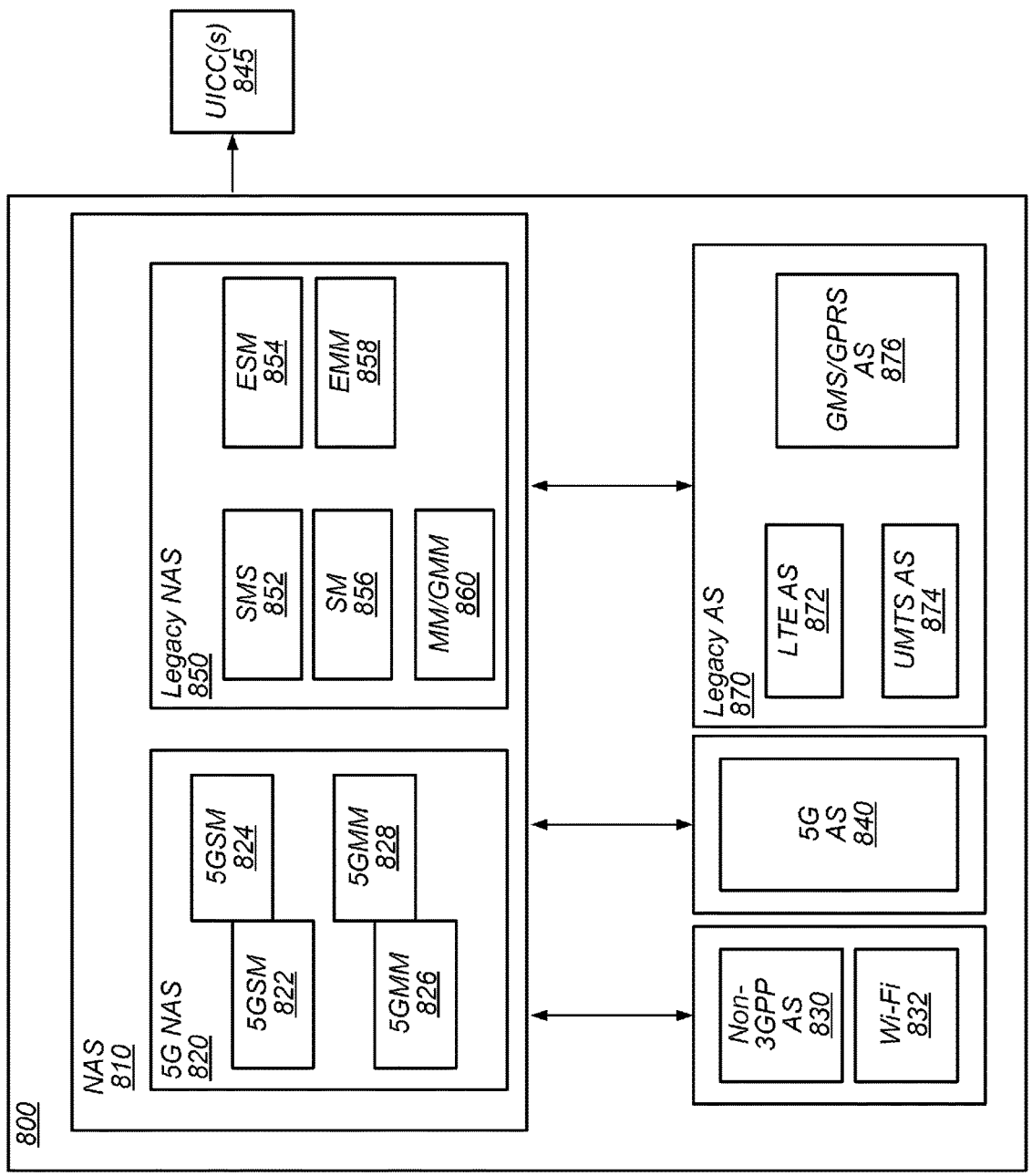
FIG. 8 illustrates an example of a baseband processor architecture for a UE, according to some embodiments.

FIGS. 7A, 7B and 8: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms for enhanced RACH procedures to avoid excessive handover/secondary cell group failures, e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for enhanced RACH procedures to avoid excessive handover/secondary cell group failures, e.g., as further described herein.

Enhanced RACH Procedures

In current implementation of Fifth Generation (5G) New Radio (NR), a base station (e.g., network) may send a handover command to a user equipment device (UE) instructing the UE to move to a frequency range 1 (FR1) cell (or a frequency range 2 (FR2) cell) based on a measurement report sent by the UE to the base station. Then, the UE may attempt a preamble physical random access channel (PRACH) transmission on the FR1 cell. However, each time the preamble PRACH transmission fails (e.g., due to transmission issues, incorrect preamble configuration, beam failures, and so forth), thereby causing a RACH failure, the UE may repeat the preamble PRACH transmission with a power ramping step until the UE reaches a maximum number of preamble PRACH transmissions, e.g., as specified by a PreambleTransMax information element (IE). Once the UE reaches the maximum number of preamble PRACH transmissions, the UE may declare a handover (HO) failure followed by a radio link failure (RLF). Additionally, the UE may acquire an FR2 band/frequency via a radio resource control (RRC) re-establishment request (e.g., an RRCRestablishment Request).

However, based on the measurement report sent by the UE, the base station (e.g., network) may again send a handover command instruction to the UE to move to an FR1 cell. Thus, the UE may send a preamble PRACH transmission on the FR1 cell and, since the UE continues to experience preamble PRACH transmission failure, the UE may repeat the cycle of declaring HO failure and acquiring an FR2 band/frequency. The UE may stay in this loop of FR1/FR2 ping ponging indefinitely. In some instances, such ping ponging may:

(i) increase UE power consumption, e.g., power is wasted on repeated preamble PRACH transmissions and subsequent RACH attempts with power ramping factor;

(ii) cause resource underutilization, e.g., random access response (RAR) preamble response is on physical downlink control channel (PDCCH) and Msg3 (e.g., connection request) is transmitted on physical uplink shared channel (PUSCH);

(iii) increases signaling overhead, e.g., due to RRC signaling in cases of repeated secondary cell group (SCG) failures and NR re-addition; and/or (iv) degrades throughput, e.g., payload can be increased with minimized signaling.

Embodiments described herein provide systems, methods, and mechanisms for a UE, such as UE 106, to enhance RACH procedures to avoid excessive handover/secondary cell group failures. For example, embodiments described herein, may provide the UE with mechanisms to avoid FR1/FR2 ping ponging as well as multiple actions to reduce preamble PRACH transmissions and/or to exit an FR1/FR2 ping ponging loop.

In addition, embodiments described herein may reduce signaling overhead, e.g., by reducing and/or avoiding RRC signaling associated with repeated SCG failures, NR re-addition, and/or RACH failures. Additionally, embodiments described herein may increase throughput, e.g., additional payload may be available due to reduced signaling. Further, embodiments described herein may improve PDCCH/PUSCH resource utilization, e.g., more efficient RACH can bring better utilization of PDCCH (RAR reception) and PUSCH (Msg-3 Connection Request transmission) resource. In addition, embodiments described herein may improve user experience, e.g., back to back (repeated) RACH failures leading to SCG failures on NR may halt high speed data and/or switching back and forth between FR1 and FR2 may not give a device antenna panels an opportunity to cool down and trigger thermal constraints. Additionally, embodiments described herein may enhance power savings at the UE, e.g., the UE may potentially save ample power by not having to transmit preamble each time.

In some embodiments, once a RACH failure threshold (e.g., a specified number of consecutive RACH failures within a specified period of time) is met for a transmission beam synchronization signal block (SSB) identifier (ID) on FR1 or FR2, the UE may attempt one or more corrective actions to avoid an FR1/FR2 ping pong sequence. For example, the UE may attempt a preamble PRACH transmission (RACH) on a different transmit beam and/or a different SSB ID. In some embodiments, the UE may opportunistically move to a next best SSB ID for subsequent RACH attempts. As another example, the UE may iteratively start with a higher initial preamble transmit power for each subsequent RACH attempt. In some embodiments, for each subsequent RACH attempt, an initial preamble power may be increase by 2 decibels (dB). Thus, the UE may increase initial preamble power by a factor of 2 dB after each failure, e.g. after a first failure, initial preamble power may be increase by 2 dB, after a second failure, initial preamble power may be increased by 4 dB, after a third failure, initial preamble power may be increase by 6 dB, and so forth. As a further example, the UE may iteratively reduce a maximum number of PRACH attempts before declaring failure by half, e.g., UE does not have to attempt the maximum number of preamble PRACH transmissions, e.g., as specified by the PreambleTransMax IE. For example, after "X" failures, the UE may reduce the maximum number of preamble PRACH transmissions by half, after "X+Y" failures, the UE may reduce the maximum number of preamble PRACH transmissions by 4, and so forth. As yet another example, the UE may increase a step size (e.g., by a factor of 2, 4, 8, and so forth) for power ramping preamble PRACH transmission.

In some embodiments, a UE may exit the RACH procedure when one or more conditions are met. For example, when a change in a signal strength metric, e.g., such as beam reference signal received power (RSRP), exceeds a percentage, the UE may exit the RACH procedure. As another example, when the UE changes a transmit beam ID, the UE may exit the RACH procedure. Additionally, as a further example, when a serving cell PCI changes, the UE may exit the RACH procedure. As yet another example, when the UE performs a successful RACH procedure and remains in connected mode for a specified duration of time without a beam failure, the UE may exit the RACH procedure.

Figure 9:
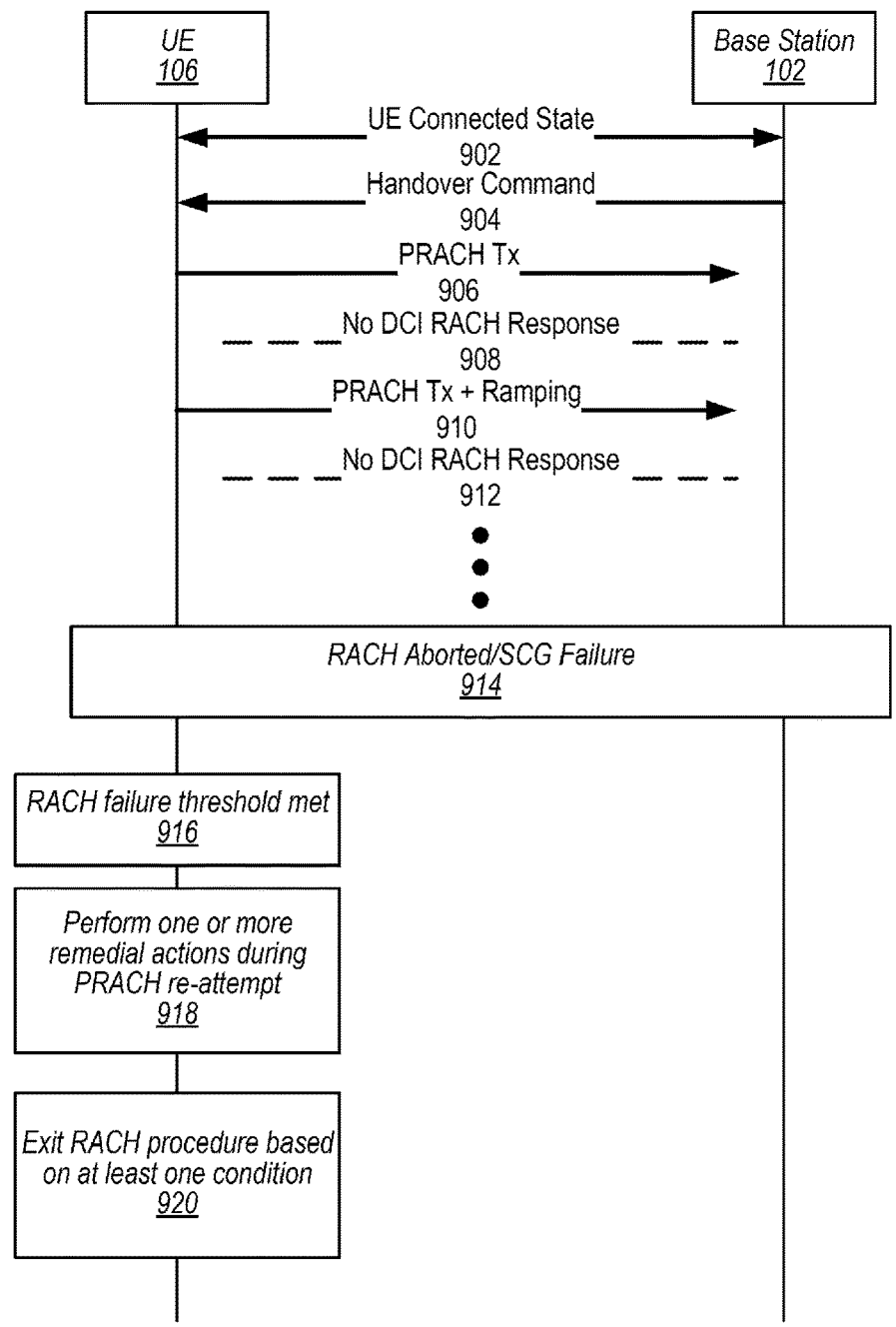
FIG. 9 illustrates an example of signaling for an enhanced RACH procedure to avoid excessive handover/secondary cell group failures, according to some embodiments.

FIG. 9 illustrates an example of signaling for an enhanced RACH procedure to avoid excessive handover/secondary cell group failures, according to some embodiments. The signaling shown in FIG. 9 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 902, a UE, such as UE 106, may be in a connected state with a network, e.g., with a base station such as base station 102. At 904, the UE may receive a handover command from the base station. For example, the UE may receive a handover command that may include an RRC reconfiguration IE. The RRC reconfiguration IE may include various parameters associated with the handover command, such as a maximum number of PRACH transmissions, a power ramping factor the UE may use to add to successive PRACH transmission power attempts.

At 906, the UE may transmit a preamble PRACH transmission at a first power level. At 908, there may be no DCI RACH response from the network. Thus, at 910, the UE may retransmit the preamble PRACH transmission at a second power level, where the second power level is based on the first power level plus the power ramping factor. At 912, there may be no DCI RACH response from the network. This process may be repeated up to the maximum number of PRACH transmissions specified by the network.

Thus, at 914, the UE, after reaching the maximum number of PRACH transmissions specified by the network, may declare handover/SCG failure, and abort the RACH procedure.

At 916, the UE may determine whether a RACH failure threshold has been met. For example, the UE may determine whether there has been a threshold number of RACH failures within a configured time period for a transmit beam SSB ID on FR1 or FR2. In some embodiments, the threshold number of RACH failures may be UE specific (e.g., statically and/or dynamically configured by the UE, e.g., based on UE power requirements, UE transmit conditions, thermal conditions at the UE, and so forth) and/or may be specified by the network (e.g., statically and/or dynamically configured by the network, e.g., for all UEs and/or for specific UEs, such as based on UE capability reporting associated with UE power requirements, UE thermal conditions and/or UE transmit conditions). Additionally, in some embodiments, the configured time window may be UE specific (e.g., statically and/or dynamically configured by the UE, e.g., based on UE power requirements, UE transmit conditions, thermal conditions at the UE, and so forth) and/or may be specified by the network (e.g., statically and/or dynamically configured by the network, e.g., for all UEs and/or for specific UEs, such as based on UE capability reporting associated with UE power requirements, UE thermal conditions and/or UE transmit conditions).

In some embodiments, if the UE determines that the RACH failure threshold has not been met, the UE may attempt to acquire an FR2 band/frequency and then receive a handover command from the network and restart the RACH procedure, e.g., with signaling 904. In such embodiments, the UE may continue such looping until the RACH failure threshold has been met.

In some embodiments, if the UE determines that the RACH failure threshold has been met, the UE may perform one or more remedial actions during a RACH procedure re-attempt. For example, the UE may attempt a preamble PRACH transmission (RACH) on a different transmit beam and/or a different SSB ID. In some embodiments, the UE may opportunistically move to a next best SSB ID for subsequent RACH attempts, e.g., as further described in reference to FIG. 10. As another example, the UE may iteratively start with a higher initial preamble transmit power for each subsequent RACH attempt. In some embodiments, for each subsequent RACH attempt, an initial preamble power may be increase by 2 decibels (dB). Thus, the UE may increase initial preamble power by a factor of 2 dB after each failure, e.g. after a first failure, initial preamble power may be increase by 2 dB, after a second failure, initial preamble power may be increased by 4 dB, after a third failure, initial preamble power may be increase by 6 dB, and so forth. As a further example, the UE may iteratively reduce a maximum number of PRACH attempts before declaring failure by half, e.g., UE does not have to attempt the maximum number of preamble PRACH transmissions, e.g., as specified by the PreambleTransMax IE. For example, after "X" failures, the UE may reduce the maximum number of preamble PRACH transmissions by half, after "X+Y" failures, the UE may reduce the maximum number of preamble PRACH transmissions by 4, and so forth. As yet another example, the UE may increase a step size (e.g., by a factor of 2, 4, 8, and so forth) for power ramping preamble PRACH transmission.

In some embodiments, the UE may "step" through one or more remedial actions. For example, the UE may attempt a RACH procedure on a different transmit beam (SSB ID) prior to attempting other remedial actions. However, if RACH failure still occurs, the UE may increase the initial preamble power. Further, if RACH failure still occurs, the UE may reduce the number of PRACH attempts before declaring RACH failure. Additionally, if RACH failure still occurs, the UE may then increase power ramping step sizes.

Note that each of these steps may be repeated iteratively and/or in combination. For example, the UE may continue to switch transmit beams and/or continue to increase the initial preamble power and/or continue to reduce the number of PRACH attempts before declaring RACH failure and/or continue to increase power ramping step sizes for each subsequent RACH attempt after RACH failure, e.g., at least until an exit condition is satisfied.

At 920, the UE may exit the RACH procedure when at least one condition is met. For example, when a change in a signal strength metric, e.g., such as beam reference signal received power (RSRP), exceeds a percentage, the UE may exit the RACH procedure. As another example, when the UE changes a transmit beam ID, the UE may exit the RACH procedure. Additionally, as a further example, when a serving cell physical cell identifier (PCI) changes, the UE may exit the RACH procedure. As yet another example, when the UE performs a successful RACH procedure and remains in connected mode for a specified duration of time without a beam failure, the UE may exit the RACH procedure. In some embodiments, the specified duration of time may be UE specific (e.g., statically and/or dynamically configured by the UE, e.g., based on UE power requirements, UE transmit conditions, thermal conditions at the UE, and so forth) and/or may be specified by the network (e.g., statically and/or dynamically configured by the network, e.g., for all UEs and/or for specific UEs, such as based on UE capability reporting associated with UE power requirements, UE thermal conditions and/or UE transmit conditions).

Figure 10:
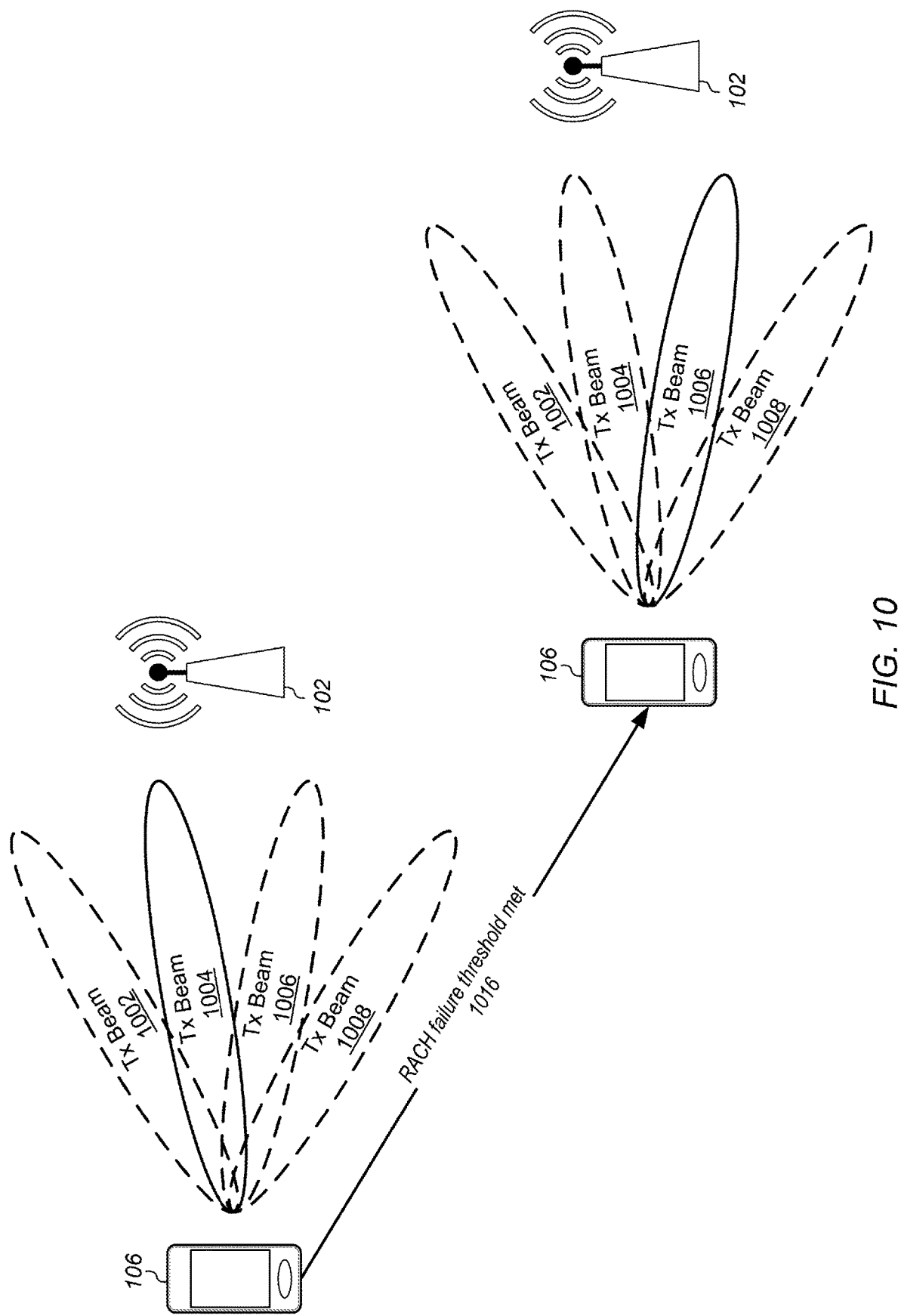
FIG. 10 illustrates an example of UE transmit beam switching for an enhanced RACH procedure to avoid excessive handover/secondary cell group failures, according to some embodiments.

FIG. 10 illustrates an example of UE transmit beam switching for an enhanced RACH procedure to avoid excessive handover/secondary cell group failures, according to some embodiments. As shown, a UE, such as UE 106, may perform beam measurements for transmit beams 1002, 1004, 1006, and 1008. For example, the UE may measure RSRP of SSBs and select a best SSB with received power above a network provided threshold. Thus, the UE may select, based on the beam measurements, that transmit beam 1004 should be used for transmissions. Thus, UE 106 may use transmit beam 1004 to transmit to a network, e.g., to a base station, such as base station 102. However, at 1016, after receiving a handover command and experiencing a RACH failure that meets a RACH failure threshold, e.g., as described above with reference to FIG. 9, the UE may (autonomously), as part of a remedial action to avoid excessive handover/secondary cell group failures, select a next "best" beam, e.g., based on previous beam measurements. For example, based on beam measurements, transmit beam 1004 may be considered as a "best" beam for transmission and transmit beam 1006 may be considered as a "next best" beam for transmission. Thus, as shown, the UE may select transmit beam 1006 for a subsequent RACH attempt.

Figure 11:
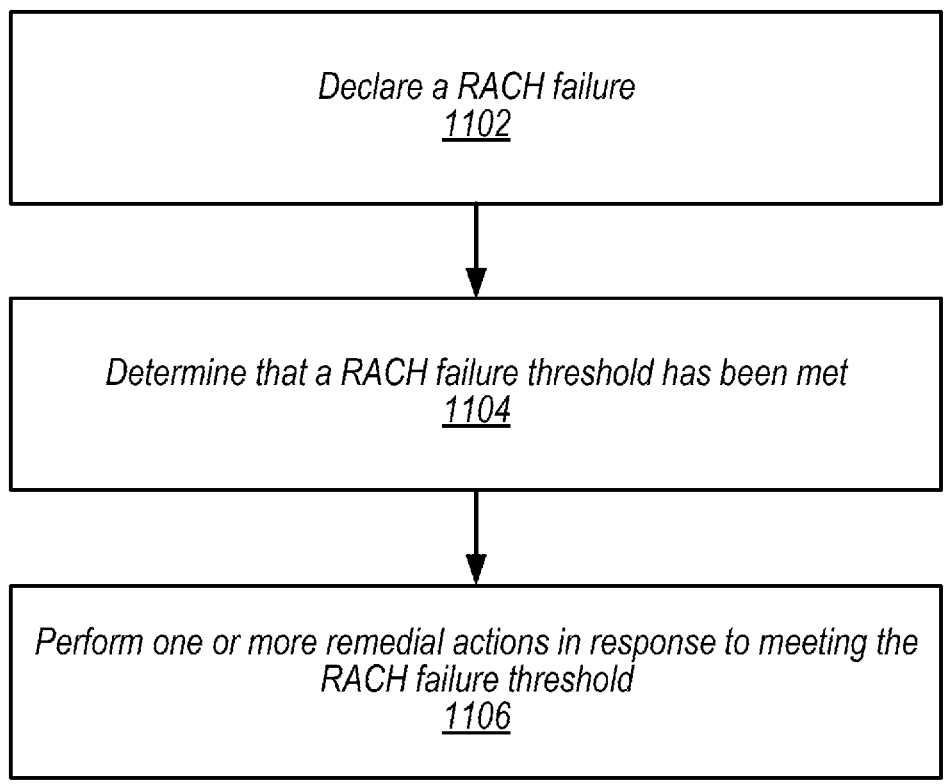
FIG. 11 illustrates a block diagram of an example of a method for an enhanced RACH procedure to avoid excessive handover/secondary cell group failures, according to some embodiments.

FIG. 11 illustrates a block diagram of an example of a method for an enhanced RACH procedure to avoid excessive handover/secondary cell group failures, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may declare a RACH procedure failure. In some embodiments, to declare the RACH procedure failure, the UE may transmit a specified number of physical RACH (PRACH) preambles without receiving a response from the network.

At 1104, the UE may determine, based on the RACH procedure failure, that a RACH failure threshold has been met. In some embodiments, to determine, based, at least in part, on the RACH procedure failure, that a RACH failure threshold has been met, the UE may determine that a number of RACH procedure failures have occurred within a time period. In some embodiments, the RACH failure threshold may be multi-dimensional. For example, a first dimension may be associated with a number of RACH procedure failures and a second dimension may be associated with a time period in which the number of RACH procedure failures occurred. Further, in some embodiments, a third dimension may be associated with a UE mobility state. Additionally, in some embodiments, a fourth dimension may be associated with whether the UE is using FR1 or FR2. In some embodiments, the UE may determine the RACH failure threshold based on any, any combination of, and/or all of (e.g., at least one of and/or one or more of) power requirements of the UE, power levels of the UE, and/or radio conditions at the UE. In some embodiments, the UE may send, to a network (e.g., to a base station of the network, such as base station 102), capabilities associated with the RACH failure threshold. In such embodiments, the capabilities may any, any combination of, and/or all of (e.g., at least one of and/or one or more of) power requirements of the UE, power levels of the UE, and/or radio conditions at the UE. The UE may receive, from the network, the RACH failure threshold, which may be based, at least in part, on the capabilities. In some embodiments, the number of RACH procedure failures may be determined based, at least in part, on any, any combination of, and/or all of (e.g., at least one of and/or one or more of) power requirements of the UE, power levels of the UE, and/or radio conditions at the UE. In some embodiments, the time period in which the number of RACH procedure failures occurred may be determined based, at least in part, on any, any combination of, and/or all of (e.g., at least one of and/or one or more of) power requirements of the UE, power levels of the UE, and/or radio conditions at the UE.

At 1106, the UE may perform one or more remedial actions in response to meeting the RACH failure threshold. In some embodiments, to perform the one or more remedial actions in response to meeting the RACH failure threshold, the UE may perform any, any combination of, and/or all of (e.g., at least one of and/or one or more of) switching transmission beams for a preamble PRACH transmission, starting with a higher initial preamble transmit power for subsequent RACH attempts, reducing a number of PRACH attempts before declaring failure by half; and/or increasing a step size for power ramping of preamble PRACH transmissions. In some embodiments, switching transmission beams for a preamble PRACH may include the UE switching to a next best transmission beam based on beam measurements. In some embodiments, starting with a higher initial preamble transmit power for subsequent RACH attempts may include the UE, for each subsequent RACH attempt, increasing an initial preamble power by 2 decibels (and/or 4 decibels, and/or 8 decibels, and so forth). In some embodiments, the step size may be increased by a factor of 2.

In some embodiments, the UE may determine that at least one exit condition has been met and may discontinue RACH procedure attempts. In such embodiments, the at least one exit condition may include any, any combination of, and/or all of (e.g., at least one of and/or one or more of) a change in a signal strength metric exceeds a percentage, a change in a transmit beam identifier, a change in a serving cell physical cell identifier (PCI); and/or a successful RACH procedure in which the UE remains in connected mode for a specified duration of time without a beam failure. In some embodiments, the signal strength metric may include a reference signal received power (RSRP). In some embodiments, the specified duration of time may be based, at least in part, on any, any combination of, and/or all of (e.g., at least one of and/or one or more of) power requirements of the UE, power levels of the UE; and/or radio conditions at the UE.

In some embodiments, to avoid excessive handover/secondary cell group failures, a UE, such as UE 106, may include a specific cause code in a secondary cell group (SCG) failure indication to indicate to a network, e.g., to a base station, such as base station 102, to stop configuring measurement objects when handover and/or SCG failures exceed a threshold. For example, the threshold may include a number of failures occurring during a time window. In some embodiments, once the network receives the specific cause code, the network may not configure a measurement object for FR1 and/or FR2 for a pre-defined time period. In some embodiments, such a timer may allow a UE to avoid consecutive SCG failures, e.g., due to uplink issues, poor transmit beam RSRP, retransmissions from network, thermal conditions at the UE, RACH failures, beam failures, and so forth. In some embodiments, upon expiration of the time period, the network may resume configuring a measurement object for FR1 and/or FR2 and the UE may resume measurement cell frequencies. In some embodiments, the UE may reduce a number of measurement reports and/or to stop reporting measurements for a particular absolute radio-frequency channel number (ARFCN) and/or frequency. In some embodiments, the UE may resume measurement reports when the UE's link has changed. In some embodiments, a change in the UE's link may be determined based on any, any combination of and/or all of (e.g., at least one of and/or one or more of) a change in the UE's global positioning system (GPS) coordinates, a change in a serving cell PCI, a changing in a serving SSB, and/or a change in a transmit beam ID.

Figure 12:
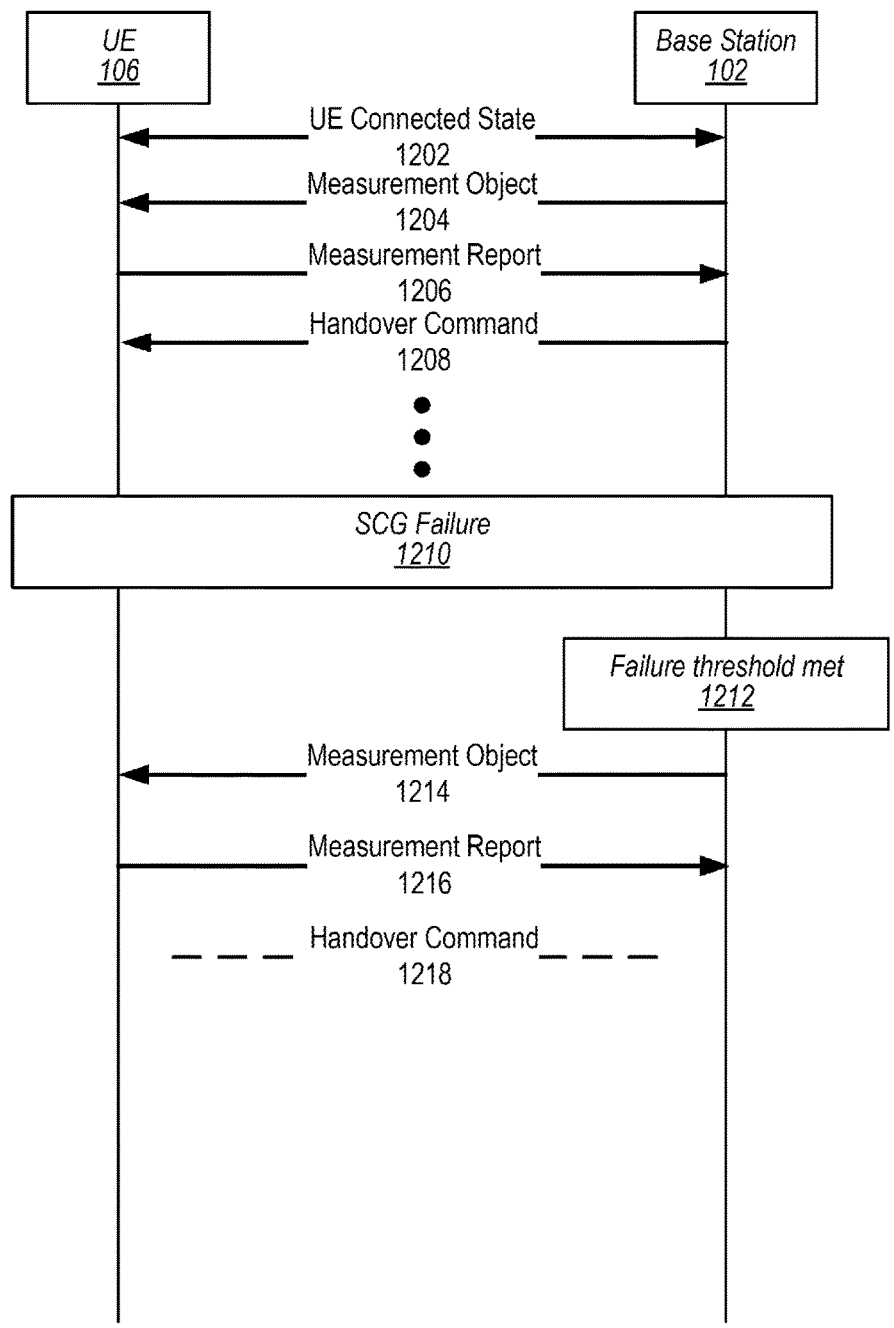
FIG. 12 illustrates an example of signaling to avoid excessive handover/secondary cell group failures, according to some embodiments.

For example, FIG. 12 illustrates an example of signaling to avoid excessive handover/secondary cell group failures, according to some embodiments. The signaling shown in FIG. 12 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1202, a UE, such as UE 106, may be in a connected state with a network, e.g., with a base station such as base station 102. At 1204, the UE may receive a measurement object configuration and, at 1206, may provide a measurement report. At 1208, the UE may receive a handover command from the base station. For example, the UE may receive a handover command that may include an RRC reconfiguration IE. The RRC reconfiguration IE may include various parameters associated with the handover command, such as a maximum number of PRACH transmissions, a power ramping factor the UE may use to add to successive PRACH transmission power attempts.

At 1210, the UE, after reaching the maximum number of PRACH transmissions specified by the network, may declare SCG failure, and abort the RACH procedure.

At 1212, the network may determine whether a failure threshold has been met. For example, the network may determine whether there has been a threshold number of SCG/handover failures within a configured time period for a transmit beam SSB ID on FR1 or FR2. In some embodiments, the threshold number of SCG/handover failures may be UE specific (e.g., statically and/or dynamically configured by the UE, e.g., based on UE power requirements, UE transmit conditions, thermal conditions at the UE, and so forth) and/or may be specified by the network (e.g., statically and/or dynamically configured by the network, e.g., for all UEs and/or for specific UEs, such as based on UE capability reporting associated with UE power requirements, UE thermal conditions and/or UE transmit conditions). Additionally, in some embodiments, the configured time window may be UE specific (e.g., statically and/or dynamically configured by the UE, e.g., based on UE power requirements, UE transmit conditions, thermal conditions at the UE, and so forth) and/or may be specified by the network (e.g., statically and/or dynamically configured by the network, e.g., for all UEs and/or for specific UEs, such as based on UE capability reporting associated with UE power requirements, UE thermal conditions and/or UE transmit conditions).

At 1214, after a specified period of time has elapsed, the UE may receive a measurement object configuration from the network and, at 1216, the UE may provide a measurement report. In some embodiments, prior to expiration of the specified period of time, the UE may cancel all measurement reports and or reduce a number of measurement reports provided to the network. At 1218, the network may cancel a handover command, thereby preventing unnecessary handover procedures between FR1 and FR2.

Figure 13:
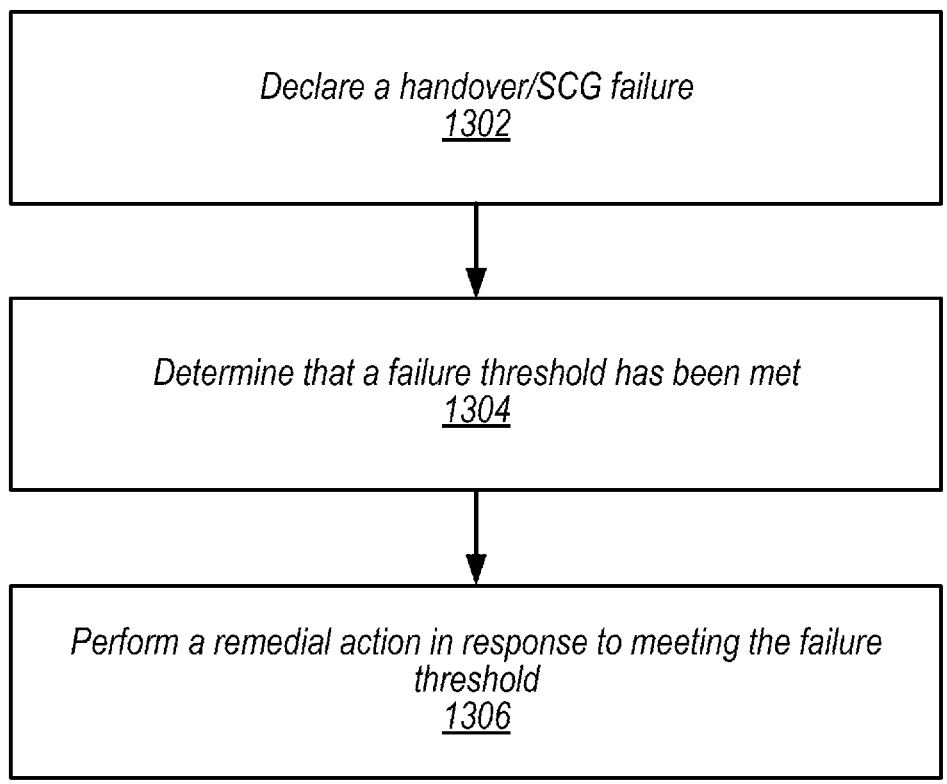
FIG. 13 illustrates a block diagram of an example of a method to avoid excessive handover/secondary cell group failures, according to some embodiments.

FIG. 13 illustrates a block diagram of an example of a method to avoid excessive handover/secondary cell group failures, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a base station, such as base station 102, may declare a handover/SCG failure. In some embodiments, to declare the handover/SCG failure, the base station may have transmitted a specified number of handover commands without RACH procedure success. In some embodiments, declaring a handover/SCG failure may be based on and/or include the base station receiving, from a user equipment device (UE), an SCG failure indication. In some embodiments, the SCG failure indication may include a cause code that may indicate that the base station should suspend measurement object configurations for the UE.

At 1304, the base station may determine that a failure threshold has been met, e.g., based on the handover/SCG failure. In some embodiments, to determine, that the failure threshold has been met, the base station may determine that a number of handover/SCG failures have occurred within a time period. In some embodiments, the failure threshold may be multi-dimensional. For example, a first dimension may be associated with a number of handover/SCG failures and a second dimension may be associated with a time period in which the number handover/SCG failures occurred. Further, in some embodiments, a third dimension may be associated with a UE mobility state. Additionally, in some embodiments, a fourth dimension may be associated with whether the UE is using FR1 or FR2. In some embodiments, the base station may determine the failure threshold based on any, any combination of, and/or all of (e.g., at least one of and/or one or more of) power requirements of a UE (e.g., such as UE 106), power levels of the UE, and/or radio conditions at the UE. In some embodiments, the base station may receive, from the UE, capabilities associated with the failure threshold. In such embodiments, the capabilities may any, any combination of, and/or all of (e.g., at least one of and/or one or more of) power requirements of the UE, power levels of the UE, and/or radio conditions at the UE. In some embodiments, the number handover/SCG failures may be determined based, at least in part, on any, any combination of, and/or all of (e.g., at least one of and/or one or more of) power requirements of the UE, power levels of the UE, and/or radio conditions at the UE. In some embodiments, the time period in which the number handover/SCG failures occurred may be determined based, at least in part, on any, any combination of, and/or all of (e.g., at least one of and/or one or more of) power requirements of the UE, power levels of the UE, and/or radio conditions at the UE.

At 1306, the base station may perform a remedial action in response to meeting the failure threshold. For example, the base station may suspend transmitting measurement object configurations for a specified period of time. In some embodiments, the specified period of time may be based on UE capabilities, e.g., such as UE reported antenna panel switching times, UE reported power constraints, UE reported transmission constraints, and/or UE reported thermal constraints. In some embodiments, suspending transmission of measurement object configurations for the specified period of time may be based on and/or include the base station receiving, from the UE, an SCG failure indication. In some embodiments, the SCG failure indication may include a cause code that may indicate that the base station should suspend measurement object configurations for the UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station, comprising:
   at least one antenna;
   at least one radio, wherein the at least one radio is configured to perform cellular communication using at least one radio access technology (RAT); and
   one or more processors coupled to the at least one radio, wherein the one or more processors and the at least one radio are configured to perform communications;
   wherein the one or more processors are configured to cause the base station to:
      receive, from a user equipment device (UE), a secondary cell group (SCG) failure indication, wherein the SCG failure indication includes a cause code requesting measurement object configurations for the UE be suspended;
      declare, in response to the SCG failure indication, a handover and/or secondary cell group (SCG) failure;
      determine that a failure threshold has been met; and
      perform a remedial action in response to meeting the failure threshold.

2. The base station of claim 1,
   wherein, to perform the remedial action in response to meeting the failure threshold, the one or more processors are further configured to cause the base station to:
      suspend transmission of measurement object configurations for a specified period of time in response to reception of the SCG failure indication.

3. The base station of claim 1,
   wherein the failure threshold is multi-dimensional, with a first dimension is associated with a number of handover/SCG failures and with a second dimension is associated with a time period in which the number of handover/SCG failures occurred.

4. The base station of claim 1,
   wherein, to determine that the failure threshold has been met, the one or more processors are further configured to cause the base station to:
      receive, from a user equipment device (UE), capabilities associated with the failure threshold, wherein the capabilities include at least one of:
         power requirements of the UE;
         power levels of the UE; or
         radio conditions at the UE; and
      determine the failure threshold based, at least in part, on the capabilities.

5. The base station of claim 4,
wherein a time period in which a number of handover and/or SCG failures occurred is determined based, at least in part, on the capabilities.

6. The base station of claim 1,
wherein, to declare the handover and/or SCG failure, the one or more processors are further configured to cause the base station to:
transmit a specified number of handover commands without a successful random access control channel (RACH) procedure.

7. The base station of claim 1,
wherein, to determine that the failure threshold has been met, the one or more processors are further configured to cause the base station to:
determine that a number of handover and/or SCG failures have occurred within a time period.

8. An apparatus, comprising:
a memory; and
at least one processor in communication with the memory, wherein the at least one processor is configured to:
receive, from a user equipment device (UE), a secondary cell group (SCG) failure indication, wherein the SCG failure indication includes a cause code requesting measurement object configurations for the UE be suspended;
declare, in response to the SCG failure indication, a handover and/or SCG failure;
determine that a failure threshold has been met; and
perform a remedial action in response to meeting the failure threshold.

9. The apparatus of claim 8,
wherein, to perform the remedial action in response to meeting the failure threshold, the at least one processor is further configured to:
suspend transmission of measurement object configurations for a specified period of time based on receiving the SCG failure indication.

10. The apparatus of claim 8,
wherein the failure threshold is multi-dimensional, with a first dimension is associated with a number of handover/SCG failures and with a second dimension is associated with a time period in which the number of handover/SCG failures occurred.

11. The apparatus of claim 8,
wherein, to determine that the failure threshold has been met, the at least one processor is further configured to:
receive, from the UE, capabilities associated with the failure threshold, wherein the capabilities include at least one of:
power requirements of the UE;
power levels of the UE; or radio conditions at the UE; and
determine the failure threshold based, at least in part, on the capabilities.

12. The apparatus of claim 11,
wherein a time period in which a number of handover and/or SCG failures occurred is determined based, at least in part, on the capabilities.

13. The apparatus of claim 8,
wherein, to declare the handover and/or SCG failure, the at least one processor is further configured to:
transmit a specified number of handover commands without a successful random access control channel (RACH) procedure.

14. The apparatus of claim 8,
wherein, to determine that the failure threshold has been met, the at least one processor is further configured to:
determine that a number of handover and/or SCG failures have occurred within a time period.

15. A non-transitory computer readable memory medium storing program instructions executable by processing circuitry to cause a network entity to:
receive, from a user equipment device (UE), a secondary cell group (SCG) failure indication, wherein the SCG failure indication includes a cause code trequesting measurement object configurations for the UE be suspended;
declare a handover and/or SCG failure;
determine that a failure threshold has been met; and
perform a remedial action in response to meeting the failure threshold, including suspend transmission of measurement object configurations for a specified period of time based on receiving the SCG failure indication.

16. The non-transitory computer readable memory medium of claim 15,
wherein declaration of the handover and/or SCG failure is based on receiving the SCG failure indication.

17. The non-transitory computer readable memory medium of claim 15,
wherein the failure threshold is multi-dimensional.

18. The non-transitory computer readable memory medium of claim 17,
wherein a first dimension is associated with a number of handover/SCG failures, and wherein a second dimension is associated with a time period in which the number of handover/SCG failures occurred.

19. The non-transitory computer readable memory medium of claim 18, wherein a third dimension is associated with a UE mobility state, and wherein a fourth dimension is associated with whether the UE is using frequency range 1 (FR1) or frequency range 2 (FR2).

20. The non-transitory computer readable memory medium of claim 15, wherein, to determine that the failure threshold has been met, the program instructions are further executable by the processing circuitry to cause the network entity:
receive, from the UE, capabilities associated with the failure threshold, wherein the capabilities include at least one of:
power requirements of the UE;
power levels of the UE; or
radio conditions at the UE; and
determine the failure threshold based, at least in part, on the capabilities.

\* \* \* \* \*